Dec. 20, 1960    L. MERAY HORVATH    2,965,761
REMOTE RADIOGRAPHY CAMERA
Filed Sept. 11, 1957    4 Sheets-Sheet 1

Inventor
LORAND MERAY-HORVATH by: J. Richard Cavanagh

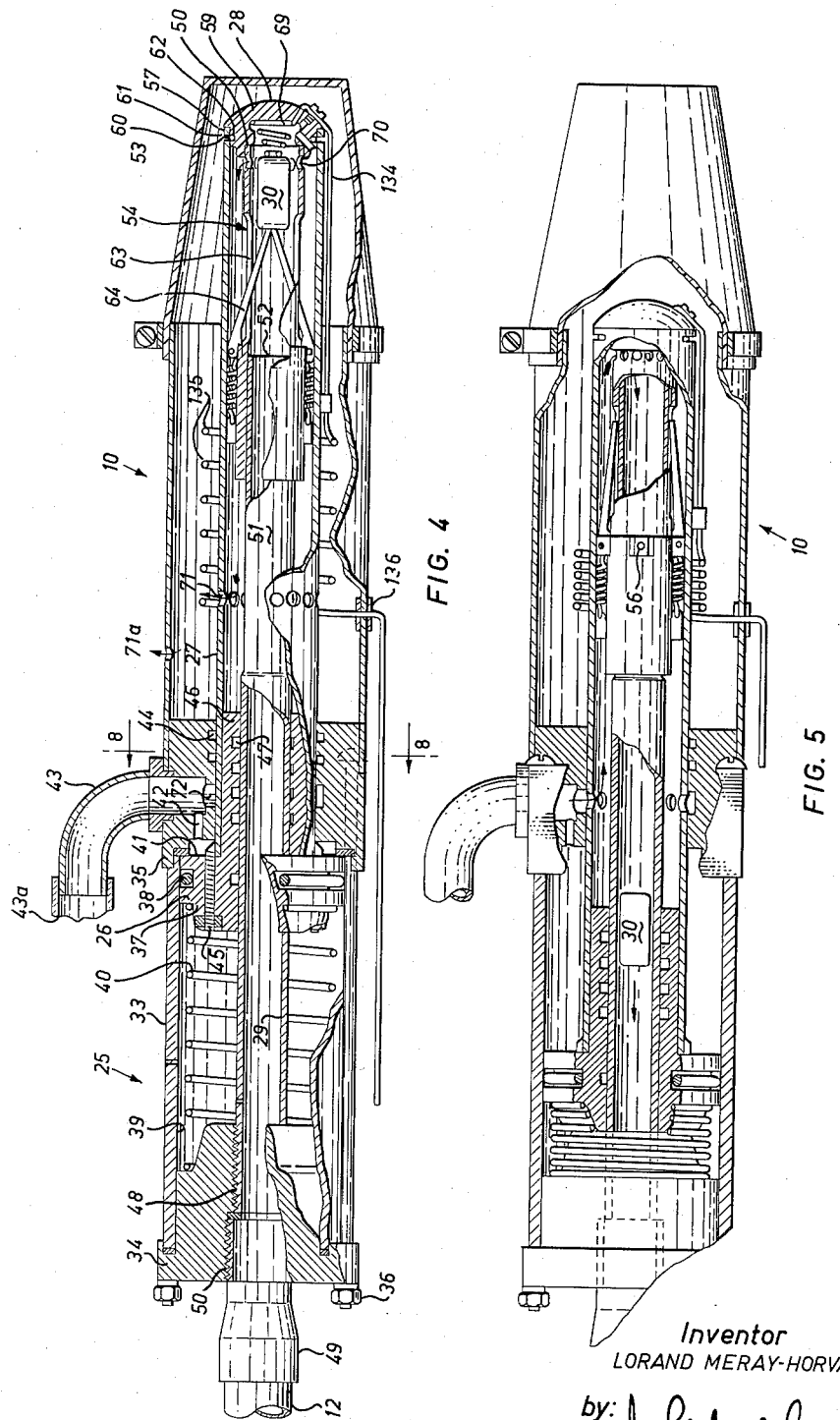

Dec. 20, 1960    L. MERAY HORVATH    2,965,761
REMOTE RADIOGRAPHY CAMERA
Filed Sept. 11, 1957    4 Sheets-Sheet 3
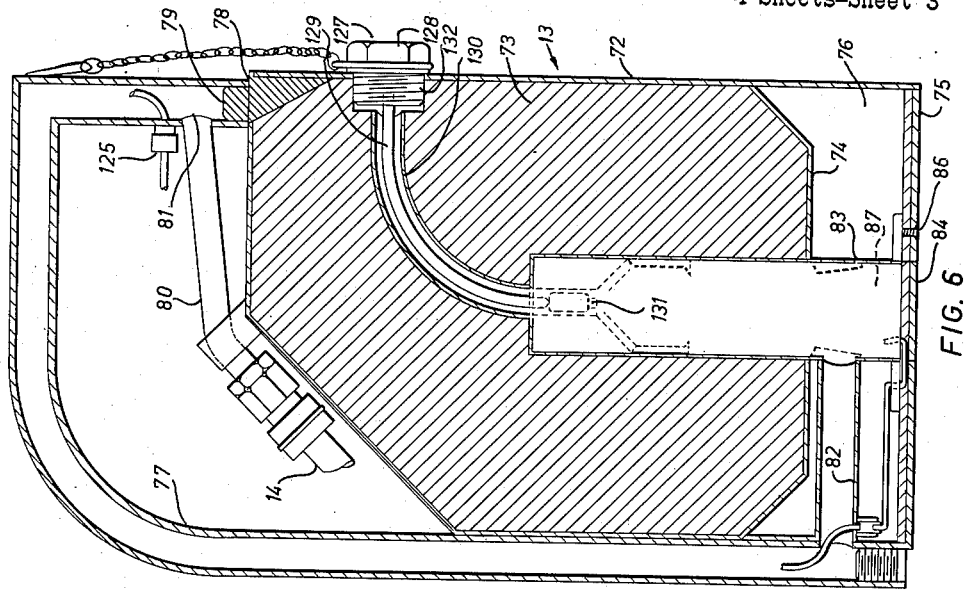
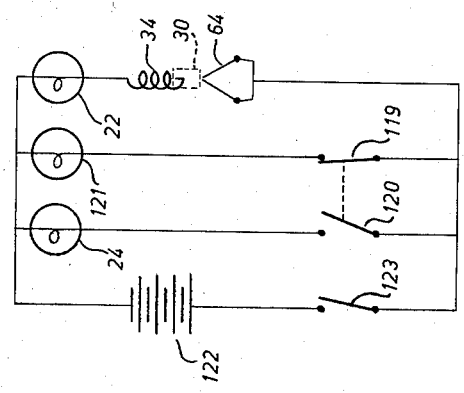
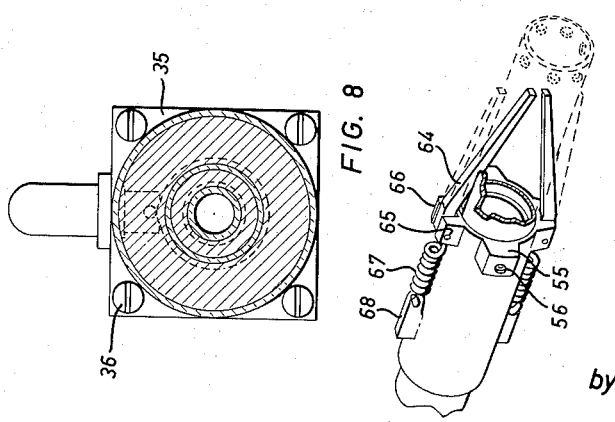
Inventor
LORAND MERAY-HORVATH
by: J. Richard Cavanagh Dec. 20, 1960

L. MERAY HORVATH 2,965,761

REMOTE RADIOGRAPHY CAMERA

Filed Sept. 11, 1957

Inventor
LORAND MERAY-HORVATH by: J. Richard Cavanagh

United States Patent Office 2,965,761
Patented Dec. 20, 1960

2,965,761

REMOTE RADIOGRAPHY CAMERA

Lorand Meray Horvath, Oakville, Ontario, Canada, assignor to Canadian Curtiss-Wright, Limited, Oakville, Ontario, Canada Filed Sept. 11, 1957, Ser. No. 683,268

Claims priority, application Canada Dec. 7, 1956

14 Claims. (Cl. 250—106)

This invention relates to a radiography camera adapted for remote operation whereby a high intensity radiation source may be employed in a variety of applications with safety.

Known remotely actuated radiography cameras are unwieldy and are generally regarded as highly dangerous in that the radiation source may become lost within the apparatus. Prior remote cameras therefore utilize weak radiation sources further limiting the use thereof to experimental or laboratory investigations.

It is the main object of the present invention to provide a remotely actuable radiography camera adapted for safe general usage in industry.

It is another object of the invention to provide a readily portable radiography camera which employs a light-weight source of power such as compressed air from a small portable compressed air cylinder.

It is the still further object of the invention to provide a pneumatically actuated radiography camera as set forth in which the source capsule is initially projected under spring pressure from a source container or "castle" to a remote camera head and is returned initially under spring pressure from the camera head to the castle.

Other objects of the invention will be appreciated by a study of the following specification taken in conjunction with the accompanying drawings.

In the drawings:

Figure 4 is a longitudinal sectional view of the camera head of the invention with the source capsule retained therein and generally corresponding functionally to the diagram of Figure 2;

Figure 5 is a different cut-away sectional view of the structure of Figure 4 but with components positioned in accordance with the function illustrated in Figure 3;

Figure 6 is a sectional view of the source castle shown in Figure 1;

Figure 7 is a perspective view of source retaining fingers of the head structure of Figures 4 and 5;

Figure 8 is a sectional view on the line 8—8 of Figure 4;

Figure 12 is an electrical schematic of the signal light circuit for the apparatus of the invention.

Figure 1:
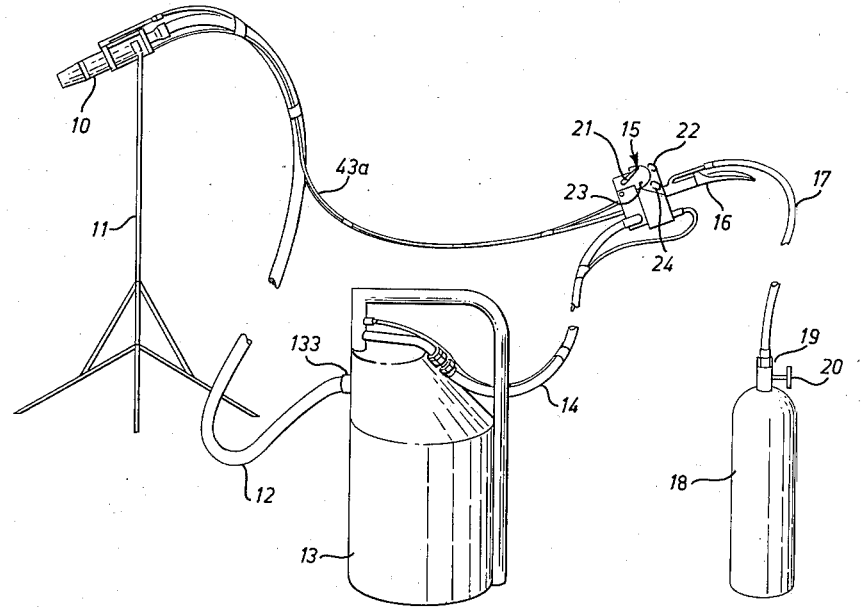
Figure 1 is a perspective view of radiography apparatus according to the invention.

Referring to the drawings, the remote radiography camera of the invention generally comprises a camera head 10 supported for convenience by a suitable tripod 11 or within or upon any structure to be examined and connected by flexible tube 12 to a source castle 13 pneumatically connected by a flexible tube 14 to a control valve device 15 connected, in turn, through a trigger valve 16 and flexible tube 17 to a compressed air bottle 18. The compressed air bottle 18 carries the usual outlet fitting 19 having a valve 20 therein and is adapted to be separated from the air line or flexible tube 17 for replacement. It is preferred to use relatively small and easily portable compressed air cylinders or bottles as shown.

In use, the camera head 10 is located appropriately with respect to the subject being examined (not shown) and about which a radiation sensitive film (not shown) is placed for exposure by radiation from the head during the exposure time determined by the residence time of a projectable radiation capsule within the head. In the first instance, the radiation capsule is retained within the castle 13 and though of high radiation intensity, is shielded by the latter in such manner as to permit safe handling and easy portability. Film exposure is made by turning the valve handle 21 of the control valve device 15 to the outgoing position. The trigger valve 16 is then manually actuated to cause the radiation capsule to be projected by pressure from air cylinder 18 from the castle 13 through tube 12 and into the head 10. Upon the capsule arriving at a point of correct location within the head 10, a red indicating light 22 is energized to signal the beginning of the exposure period and to signal the location of the source capsule in an area of danger. After the desired exposure time, the operator switches the control valve handle 21 to a reverse position indicated at 23, at which air flow in the flexible tube or line 12 is reversed, causing the source capsule to return to the castle 13. The moment the source capsule arrives at the desired safe location within the castle 13, the signal light 24 is energized to indicate that the apparatus is safe for further handling. As will be developed in the following disclosure, the signal lights 22 and 24 can only be energized when the source capsule is at the extreme limits of its travel either in a position for exposure in the head or in a safe handling position within the castle.

While in the camera head 10, the source capsule is retained in a fixed position for exposure. The manner in which the capsule is actuated under air pressure to and from the camera head is indicated functionally in Figures 2 and 3.

In a general sense, the camera head 10 comprises the cylinder 25 having a piston 26 therein and connected to a tube 27 projecting axially from the cylinder and having a closed end 28. An inner stationary tube 29 fixed axially through cylinder 25 and forming a part of the air line 12 under action of air flow in the direction of arrow Y conveys the source capsule 30 past the deflectable retaining fingers 31 to a position against end wall 28. The retaining fingers are supported by the piston tube 27 and are normally deflected inwardly to a capsule retaining position under spring pressure. Accordingly, the capsule cannot be conducted in a reverse direction through tube 29 until the retaining fingers 31 are deflected outwardly.

Figure 2:
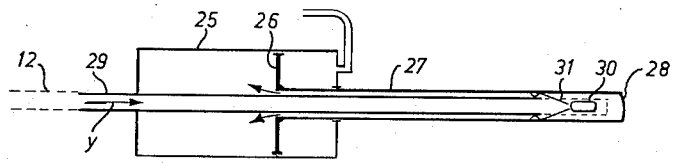
Figure 2 is a function diagram of the camera head during projection of the source capsule thereinto.
Figure 3:
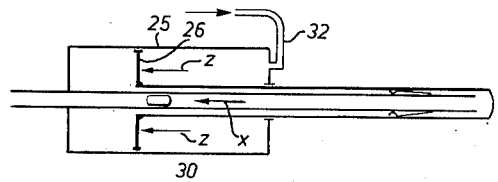
Figure 3 is another function diagram of the camera head during return of the source capsule therefrom toward the castle.

As shown in Figure 3, the capsule may be withdrawn from the head by air pressure entering fitting 32 of cylinder 25 causing the piston 26 to retract in the direction of arrow Z, thereby carrying the piston tube 27 rearwardly over the inner stationary tube 29 to cause the retaining fingers 31 to be deflected outwardly thereby and enabling the source capsule 30 to pass in the direction of arrow X in the tube 29. It will be observed that air in cylinder 25 on the left side of piston 26 is free to flow toward the closed end 28 of piston tube 27 for escape through tube 29 in the direction of arrow X. If air flow is reversed in the tube 29 to the direction shown in Figure 2, then the source capsule 30 will again be projected outwardly past the retaining fingers 31 while at the same time air pressure against the end wall 28 of piston tube 27 and flowing between tubes 27 and 29 to the cylinder behind the piston 26 will cause the piston and piston tube to project outwardly until the retaining fingers are able to close behind the source capsule. Provision must be made for the flow of additional air enabling the capsule to be conveyed through the tube 12 shown in Figure 1. In addition, the invention contemplates that the source capsule be initially projected under spring pressure from the source capsule outwardly and from the head on the return path. These features of construction are evident in the more detailed drawings of Figures 4 to 9.

Figure 11:
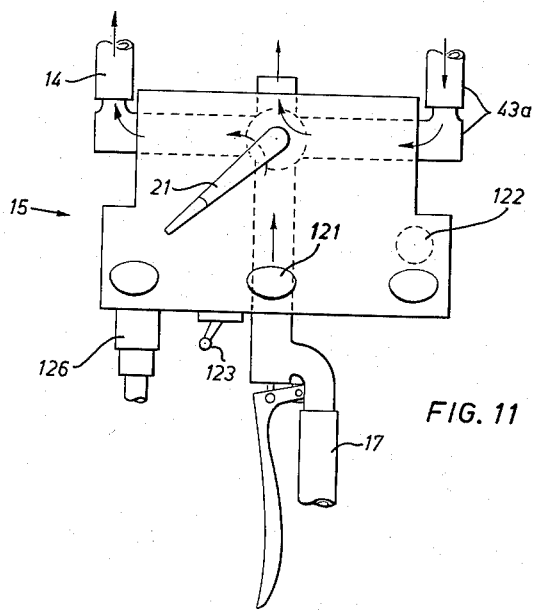
Figure 11 is a plan view of a control valve device used for remote control of apparatus of the invention.

The mechanical construction of camera head of the invention is shown in more detail in Figures 4 and 5 in which like numerals indicate like parts as compared with the diagrammatic illustrations of Figures 2 and 3. The cylinder 25 comprises the cylindrical tube 33 supported between the base member 34 and the fitting block 35, being retained therein by the longitudinal exterior bolts 36 extending between the fitting block and base member. The piston 26 is in the form of a piston head 37 carrying a slidable sealing ring 38 adapted to form a slidable seal against the inner surfaces 39 of the cylinder tube 33. The piston is adapted to move rearwardly against the pressure of the biasing spring 40 under reversing air pressure against its annular forward face 41 from duct 42 communicating with the reverse air line fitting 43 connected to return air line 43a communicating with control valve device 15 as shown in Figures 1 and 11. The piston tube 27 is slidable within an axial bore 44 of the fitting block 35 and supports at its rearward end, the rearwardly extending bolts 45 supporting the piston head 37. The forwardly and inwardly extending projection 46 on piston head 37 embodies an axial bore 47 for slidable motion over the inner stationary tube 29 rigidly threaded as at 48 to the base 34. An air line fitting 49 for air line 12 is threaded in base 34 as at 50 for communication with stationary tube 29 as shown.

The stationary tube 29 has a reduced diameter portion 51 extending forwardly of the fitting block 35 and coaxially therewith to terminate at a terminal lip 52 normally spaced a predetermined distance from end wall 28 to provide a source chamber 53 therebetween.

The source chamber 53 is defined by an intermediate tube or sleeve 54 having radial projections 55 thereon (see Figure 7) adapted to be fastened by screws extending into the threaded holes 56 to the piston tube 27 so that the outward free end 57 of piston tube 27 and the outward end 58 of the intermediate tube 54 are adapted to be closed by the plastic cap fitting 59 serving as an end wall 28. The cap fitting 59 is held in assembly with the outward end 57 of the piston tube 27 by a circumferential spring clamp 60 extending into the lateral slots 61 therein and adapted to engage in a circumferential recess 62 of the cap 59 as shown also in Figure 5. The intermediate tube is slotted longitudinally as at 63 to accommodate retaining fingers 64 pivotted as at 65 on radial brackets 66 thereof and biased for normal inward positioning by tension springs 67 extending rearwardly from a spring connection inwardly of the pivot 65 to the anchorage brackets 68 as shown in Figure 7. The end cap 59 supports a return spring 69 adapted to make electrical contact to the capsule 30 and to bias it for return motion through the inner stationary tube 29 upon outward deflection of the retaining fingers 64.

Upon reverse air pressure being applied from the air fitting 43 to drive the piston 26 rearwardly against the pressure of spring 40, the piston tube 27 and the intermediate tube 54 are drawn rearwardly to cause the retaining fingers 64 to be engaged by the stationary outward end or lip 52 of the stationary tube 29 thereby causing the retaining fingers to be deflected outwardly to the position indicated in Figure 5 at which the capsule 30 is released for rearward projection under action of the pressure of the return load spring 69. As shown, apertures 70 in the intermediate tube at the outward end thereof permit air flow from the capsule chamber 53 to the valve orifices 71 of the piston tube 27. As shown in Figure 5, the valve orifices 71 arrive at the rearward limit of travel of the piston in a position of registry with the end opening 72 of the reverse air fitting 43 whereby return air pressure flows in the direction of the arrows shown in the said figure past the retaining fingers 64 and supporting structure therefor through the end apertures 70 of the intermediate tube to drive the capsule 30 in a return direction back through the stationary tube 27 and air line 12.

Figure 9:
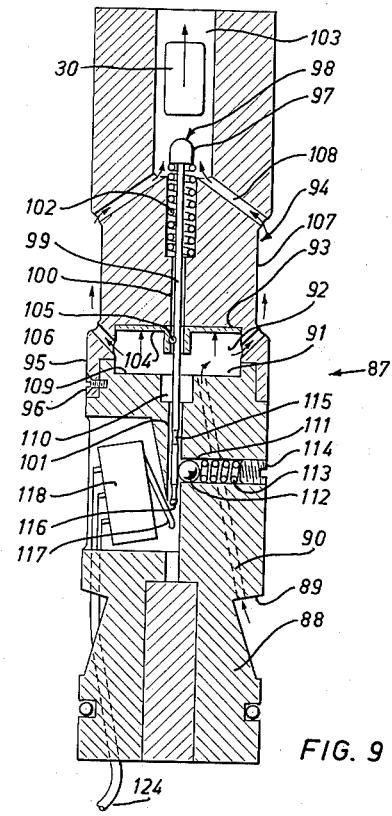
Figure 9 is an enlarged sectional view of a source actuating device forming a part of the "castle" of Figure 6.

The source castle 13 is shown in more detail in vertical section in Figure 6. The housing 72 of generally cylindrical form encases a lead body 73 supported therein by the intermediate wall 74 spaced from bottom wall 75 to provide chamber 76. Tubular handle 77 is fastened to housing 72 at 78 at which point it is sealed by a sealing plug 79. The air line 14 connects by a fitting 80 to the handle as at 81 to cause air under pressure to proceed through the handle to the inwardly projecting portion 82 thereof adjacent the base or bottom wall 75 of the housing. A tubular socket 83 rests upon a base cap 84 adapted to be fastened to base 75 by screws 86 and extend into the body 73. A source actuating device 87 shown in chain lines but revealed in detailed section in Figure 9 is adapted to be placed in socket 83 as indicated.

The castle source actuating device 87 comprises a base 88 having an annular recess 89 from which air communicating ducts 90 extend upwardly therethrough to the inner recessed portion 91 adapted to form a piston chamber 92 in co-operation with an opposed recessed portion 93 of a storage head part 94 fastened thereto in the flange portion 95 thereof by means of a screw 96 or other suitable means. The recess 89 is positioned adjacent the inwardly projecting portion 82 of handle 77 to receive air from the latter. A source actuating member 97 having a head 98 and locking rod 99 slidably rides in the vertical bore 100 of the head 94 and the coaxial vertical bore 101 of the base part 88 being normally biased by spring 102 to an outward position within the enlarged source carrying bore 103 in the source storing head 94. The actuating rod 99 carries a piston element 104 fastened thereto by a pin 105 whereby compressed air proceeding up the passages 90 causes the piston to move toward the upper limit of its travel within the chamber 92, thereby permitting the air to pass therefrom out of the intermediate outwardly directed passages 106 to the recessed portion 107 of the actuating head and to return therefrom to the inwardly directed passages 108 to the bore 103.

Figure 10:
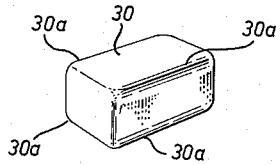
Figure 10 is a perspective view of a typical radiation source capsule.

In operation and upon return of the source 30 through the line 12 as described with reference to Figure 5, the source capsule 30 being of generally rectangular form in transverse section and shaped as indicated in Figure 10, arrives in the source storing head 87 while air is permitted to flow in the reverse direction to the arrows shown in Figure 9 and through the air line 14 to the valve mechanism 15 for escape to the atmosphere.

The source capsule strikes the actuator head 97 and under its inertia, forces the latter and the actuating rod 99 downwardly against the force of biasing spring 102 and the pressure against piston 104 to cause the latter to pass downwardly below the passages 106 thereby causing the actuating rod to be further impelled downwardly thereby for seating against the lower surfaces 109 and 110 of chamber 92.

At this point of operation, the snap ball retaining device 111 comprising the ball 112 biased inwardly under the action of spring 113 held by screw 114 engages in a recess 115 of the actuating rod retaining the latter in the downward position against the force of the biasing spring 102 while at the same time the lower end 116 of the actuating rod engages the actuating arm 117 of sensitive switch 118 effecting closure of an electrical circuit for a green indicating light 24 as shown in the schematic arrangement of Figure 12. The sensitive switch 118 is of the double acting type and embodies switch members 119 and 120 whereby in the engaged position of the sensitive switch arm 117, the switch arm 120 thereof is normally closed whereas switch arm 119 is normally open. These two switch components control the amber light 121 and green indicating light 24 respectively in such manner that they are controllably energized by a battery source 122 (see also Figure 11) while toggle switch 123 is closed, to indicate that the source 30 is in transit. The amber light is therefore energized for the position of the source in the actuating device 87 shown in Figure 9. The green light is energized to indicate that the source 30 is within the actuating source head and the castle when actuating rod 99 is depressed to a position actuating the sensitive switch arm 117. The sensitive switch 18 is connected by a small cable 124 through the handle 17 and outlet 125, being taped to air line 14 for communication by fitting 126 to the manual valve mechanism 15 and battery and lights therein.

When it is desired to project the source toward the head from its stored position within the castle, the source retainer plug 127 as shown in Figure 6 must first be removed. The source retainer plug comprises the screw head 128 having a flexible retaining rod 129 adapted to project flexibly through the curved source conducting conduit 130 formed within the lead shield body 73 in such manner that the source must change its direction through 90° upon proceeding into a source storing position or from a source storing position exterior of the castle. The source is shown retained in a source storing position 131 indicated in chain lines by the retaining rod 129. It will be observed that the source at this position is located centrally of the shielding mass of lead 73 but within the actuating device 87. Upon removal of the source retainer plug 127, the source communicating line 12 is connected to the threaded socket 132 of castle 13 by the threaded fitting 133. The toggle switch 123 is turned to the "on" position connecting battery 122 in the light circuit. The manual valve actuating arm 21 is then moved from the neutral position substantially in line with the amber light 121 to a position shown in Figure 11 at which it points to the red indicating light, thereby causing air flow indicated by the direction of the arrows in this figure obtained from air under pressure from the air supply line 17 communicating to the air pressure cylinder 18. Compressed air therefore flows to the castle 13 by way of the air communicating line 14 and handle 77 thereof to rise upwardly through the source actuating head 87 as described, effecting upward actuation of piston 104 to release the actuating rod from the retaining ball 112. Immediately thereupon, the biasing force of spring 102 projects the source 30 upwardly in the upper bore 103 substantially to the position indicated in Figure 9 immediately followed by air pressure flowing from the piston chamber 92 through the inwardly directed passages 108 to drive the source through the line 12 to the head 10.

As soon as the piston 104 moves upwardly in the source actuating head, the sensitive switch 118 is actuated to open switch component 119 and close switch component 120 thereby de-energizing the green light 22 and energizing the amber light 121. The amber light continues to show while the source is out of the castle. Air flow in the head proceeds through the stationary tube 29 as shown in Figure 4 and from the outward end thereof through orifices 70, 71, and 71a to the atmosphere. The source continues its travel past the deflectable retaining fingers 64 to strike against the biasing spring 69 depressing the latter under the inertia of its travel and permitting the retaining fingers to close therebehind under action of their biasing springs 67. Once the retaining fingers 64 close behind the source holding it in contact with the spring 69, an electrical circuit is completed for the red indicating light as shown in Figure 12. The retaining fingers 64 are grounded whereas the spring 69 is connected by a suitable lead 134 coiled for flexibility as at 135 and extending upwardly through a fitting 136 for connection to the red indicating light as indicated in Figure 12.

As shown in Figure 10, the source capsule 30 preferably embodies longitudinal guide means 30a extending radially therefrom to reduce friction of passage thereof through the tube 12, which latter in conjunction with the source of air pressure 18 and control 15, serves as means for returnably conveying the source capsule from the source container shown in the form of the source actuating device 87 in castle 13 to the source chamber 53 (Figure 4). The control device 15 is manipulated from a remote station by the operator to effect conveyance of the source capsule in the desired direction. Source retaining means in the form of the fingers 31 are retracted responsive to reverse air pressure as described.

The deflectable retaining means or fingers 31 are also adapted to be deflected by the source capsule upon entering the source chamber in the camera head. The springs at both end limits of travel of the capsule serve initially to project the capsule upon release for conveyance under air pressure from one end limit to the other. Indicating means in the form of the lamps or equivalent warning or indicating devices are actuated by the source capsule to indicate the position thereof in the apparatus. Separate sources of energy are provided for the conveying and indicating means. Accordingly, failure of air pressure does not hinder the operator in locating the source capsule. If the source capsule is in the camera head source chamber, it is retained therein by the retaining means until return air pressure is applied. By these divers means, remote apparatus of the class described is rendered of practical utility for general usage in industrial and other applications.

While a specific and preferred form of the invention has been set forth in detail to better explain the inherent novelties of the invention, it will be apparent to skilled persons that many modifications may be practiced in arrangement and structure without departing from the concept and spirit of the invention. Therefore, it is intended that the present disclosure should not be construed in a sense other than that warranted by the scope of the following claims having regard to the prior art.

What I claim as my invention is:

1. Remote controlled radiography apparatus comprising, in combination: a radiation source capsule; a camera head having a radiation source chamber therein; a source container adapted to be placed remote from said camera head; means for returnably conveying said source capsule from said source container to said source chamber; and deflectable retaining means adapted to be deflected by said source capsule upon entering into said chamber and retaining said source capsule therein.

2. Remote controlled radiography apparatus comprising in combination: a radiation source capsule; a camera head having a radiation source chamber therein; a source container adapted to be placed remote from said camera head; means for returnably conveying said source capsule from said source container to said source chamber; deflectable retaining means adapted to be deflected by said source capsule upon entering into said chamber and retaining said source capsule therein; means for controlling the direction of conveying motion of said capsule to and from said chamber; and means responsive to said control for retracting said retaining means to release said source capsule for conveyance from said head to said source container.

3. Remote controlled radiography apparatus comprising, in combination: a radiation source capsule; a camera head having a radiation source chamber therein; a source container adapted to be placed remote from said camera head; means for returnably conveying said source capsule from said source container to said source chamber; deflectable retaining means adapted to be deflected by said source capsule upon entering into said chamber and retaining said source capsule therein; and spring means in said source chamber adapted initially to project said source capsule toward said source container upon retraction of said retaining means.

4. Remote controlled radiography apparatus comprising, in combination: a radiation source capsule; a camera head having a radiation source chamber therein; a source container adapted to be placed remote from said camera head; means for returnably conveying said source capsule from said source container to said source chamber; deflectable retaining means adapted to be deflected by said source capsule upon entering into said chamber and retaining said source capsule therein; and source actuable signal means for said container and said source chamber for indicating the position of said source in said apparatus.

5. Remote controlled radiography apparatus comprising, in combination: a radiation source capsule having longitudinal guide means extending radially therefrom; a camera head having a radiation source chamber therein; a source container adapted to be placed remote from said camera head; means for returnably conveying said source capsule from said source container to said source chamber; and deflectable retaining means adapted to be deflected by said source capsule upon entering into said chamber and retaining said source capsule therein.

6. Remote controlled radiography apparatus comprising, in combination: a radiation source capsule; a camera head having a radiation source chamber therein; a source container adapted to be placed remote from said camera head; means for returnably conveying said source capsule from said source container to said source chamber; deflectable retaining means adapted to be deflected by said source capsule upon entering into said chamber and retaining said source capsule therein; means for controlling the direction of conveying motion of said capsule to and from said chamber; means responsive to said control for retracting said retaining means to release said source capsule for conveyance from said head to said source container; and spring means in said source chamber adapted initially to project said source capsule toward said source container upon retraction of said retaining means.

7. Remote controlled radiography apparatus comprising, in combination: a radiation source capsule; a camera head having a radiation source chamber therein; a source container adapted to be placed remote from said camera head; means for returnably conveying said source capsule from said source container to said source chamber; deflectable retaining means adapted to be deflected by said source capsule upon entering into said chamber and retaining said source capsule therein; means for controlling the direction of conveying motion of said capsule to and from said chamber; means responsive to said control for retracting said retaining means to release said source capsule for conveyance from said head to said source container; and source actuable signal means for said container and said source chamber for indicating the position of said source in said apparatus.

8. Remote controlled radiography apparatus comprising, in combination: a radiation source capsule; a camera head having a radiation source chamber therein; a source container adapted to be placed remote from said camera head; means for returnably conveying said source capsule from said source container to said source chamber; deflectable retaining means adapted to be deflected by said source capsule upon entering into said chamber and retaining said source capsule therein; spring means in said source chamber adapted initially to project said source capsule toward said source container upon retraction of said retaining means; and source actuable signal means for said container and said source chamber for indicating the position of said source in said apparatus.

9. Remote controlled radiography apparatus comprising, in combination: a radiation source capsule; a camera head having a radiation source chamber therein; a source container adapted to be placed remote from said camera head; means for returnably conveying said source capsule from said source container to said source chamber; deflectable retaining means adapted to be deflected by said source capsule upon entering into said chamber and retaining said source capsule therein; means for controlling the direction of conveying motion of said capsule to and from said chamber; means responsive to said control for retracting said retaining means to release said source capsule for conveyance from said head to said source container; spring means in said source chamber adapted initially to project said source capsule toward said source container upon retraction of said retaining means; and source actuable signal means for said container and said source chamber for indicating the position of said source in said apparatus.

10. In remote controlled radiography apparatus of the pneumatic type, a camera head for a source capsule comprising in combination: a cylinder having a source carrying tube fixed axially therein and projecting therethrough to define a free terminal end; a piston in said cylinder slidable over said source tube and annularly spaced thereon; a piston tube mounted on said piston and extending slidably beyond one end of said cylinder co-axially about said source tube in annular spaced relation to the latter; means providing an end wall for said piston tube beyond the terminal end of said source tube but closely spaced therefrom at the innermost position of said piston in said cylinder; an intermediate source chamber tube spaced annularly within said piston tube and fixed thereto, being slidable over the terminal end of said source tube; and deflectable retaining means normally biased to retain a source capsule in said source chamber tube and deflectable by said source capsule during motion of the latter through said source tube to said chamber; and means for retracting said retaining means upon motion of said piston toward the innermost position within said cylinder.

11. Remote controlled radiography apparatus comprising, in combination, a radiation source capsule; a camera head having a radiation source chamber therein; a source container adapted to be placed remote from said camera head; conveying means for returnably conveying said source capsule from said source container to said source chamber; and retaining means arranged in said camera head for retaining said source capsule in said radiation source chamber independently from said conveying means.

12. Remote controlled radiography apparatus comprising in combination, a radiation source capsule; a camera head having a radiation source chamber therein; a source container adapted to be placed remote from said camera head; conveying means for returnably conveying said source capsule from said source container to said source chamber; releasable retaining means arranged in said camera head for retaining said source capsule in said radiation source chamber independently from said conveying means; control means for controlling the direction of conveying motion of said capsule to and from said chamber; and release means responsive to said control for releasing said retaining means and thereby release said source capsule for conveyance from said head to said source container.

13. Remote controlled radiography apparatus comprising in combination, a radiation source container; a radiographic camera head having a radiation source chamber therein and being arranged at a position remote from said source container; a radiation source capsule being movable between said radiation source chamber in said camera head for radiographic purposes and said source container for storage purposes; means for conveying said source capsule from said source container to said source chamber in said camera head under positive fluid pressure; releasable retaining means arranged in said camera head for retaining said source capsule in said radiation source chamber independently from said positive fluid pressure; and means for releasing said retaining means and conveying said source capsule back to said source container under positive fluid pressure, whenever desired.

14. In a pneumatically operated, remotely controlled radiographic apparatus, a camera head for a source capsule, comprising in combination, a substantially cylindrically shaped housing; a source carrying tube through which the source capsule is conveyed and arranged substantially axially of said housing, said source tube having one end portion thereof adapted to be connected to a pneumatic tube arrangement; a stop member arranged at the other end of said source carrying tube; piston means in said housing slideably mounted on said source tube and having an axially channel therein communicating with said source carrying tube; retaining means arranged on said piston means and spaced from said stop means for retaining the source capsule within the camera head between the same and said stop means; and means for directing fluid pressure against said piston means to release said retaining means and convey the source capsule through the source carrying tube whenever desired.

References Cited in the file of this patent

UNITED STATES PATENTS 2,750,517    Baum _____ June 12, 1956